US012734656B1

(12) United States Patent
Stickney et al.

(10) Patent No.: US 12,734,656 B1
(45) Date of Patent: Sep. 15, 2026

(54) LIGHTING FEATURES FOR TOOLS

(71) Applicant: Snap-on Incorporated, Kenosha, WI (US)

(72) Inventors: Jack H. Stickney, Oak Creek, WI (US); Jason Genz, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 19/248,038

(22) Filed: Jun. 24, 2025

(51) Int. Cl.
*B25B 23/18* (2006.01)
*B25B 21/00* (2006.01)
*B25B 23/16* (2006.01)
*F21V 33/00* (2006.01)

(52) U.S. Cl.
CPC ............ *B25B 23/18* (2013.01); *B25B 21/004* (2013.01); *F21V 33/0084* (2013.01); *B25B 23/16* (2013.01)

(58) Field of Classification Search
CPC ....... B25B 21/004; B25B 23/16; B25B 23/18; F21V 33/0084
See application file for complete search history.

(56) References Cited

U.S. PATENT DOCUMENTS

| | | | |
|---|---|---|---|
| 5,525,842 | A | 6/1996 | Leininger |
| 6,126,295 | A | 10/2000 | Hillinger |
| 6,283,606 | B1 | 9/2001 | Wei et al. |
| 6,454,429 | B1 | 9/2002 | Liao |
| 7,188,966 | B1 | 3/2007 | Lin |
| 8,317,350 | B2 | 11/2012 | Friedman et al. |
| 8,328,381 | B2 | 12/2012 | Dixon et al. |
| 8,506,108 | B2 | 8/2013 | Friedman et al. |
| 8,820,955 | B2 | 9/2014 | Dixon et al. |
| 8,827,483 | B2 | 9/2014 | Dixon et al. |
| 9,028,088 | B2 | 5/2015 | Vanko et al. |
| 9,114,512 | B2 | 8/2015 | Beer et al. |

(Continued)

FOREIGN PATENT DOCUMENTS

| | | | |
|---|---|---|---|
| CN | 107855971 | A | 3/2018 |
| DE | 202009007893 | U1 | 8/2009 |

(Continued)

OTHER PUBLICATIONS

Kingnova Cordless Electric Ratchet Wrench ⅜" ¼", ½", 40 Ft-lbs, 12V Power Ratchet Wrench Kit, 2-Pack 2.0Ah Lithium-Ion Batteries, 1H Fast Charger, 3" 6" 10" Extension Bar, 7 Sockets, URL: https://www.amazon.com/Cordless-Electric-KINGNOVA-batteries-Accessories/dp/B08WKZHQ7S, Retrieved Jun. 24, 2025.

(Continued)

*Primary Examiner* — Keith G. Delahoussaye
(74) *Attorney, Agent, or Firm* — Taft, Stettinius & Hollister LLP

(57) ABSTRACT

A lighting assembly that is incorporated into a tool, and includes a plurality of illumination elements, such as light emitting diodes (LEDs), that can be activated/illuminated individually or together. The illumination elements may be part of one or more lighting elements that cooperatively form the lighting assembly. In an example, the lighting assembly may include a lighting element that is coupled to an elongated housing portion or neck housing of a tool, such as a powered ratchet or powered torque wrench, to provide enhanced illumination, compared to current light features built into cordless tools.

20 Claims, 7 Drawing Sheets

(56) References Cited

U.S. PATENT DOCUMENTS

| | | | | |
|---|---|---|---|---|
| 9,328,915 | B2 | 5/2016 | Vanko et al. | |
| 9,352,458 | B2 | 5/2016 | Friedman et al. | |
| 9,644,837 | B2 | 5/2017 | Vanko et al. | |
| 10,052,733 | B2 | 8/2018 | Ely et al. | |
| 10,543,588 | B2 | 1/2020 | Vanko et al. | |
| 10,960,509 | B2 | 3/2021 | Ely et al. | |
| 11,090,786 | B2 | 8/2021 | Puzio | |
| 11,213,937 | B1 | 1/2022 | Rajzer et al. | |
| 2018/0071901 | A1* | 3/2018 | Silha | B25B 21/004 |
| 2021/0088210 | A1 | 3/2021 | Purdy et al. | |
| 2023/0366535 | A1* | 11/2023 | Chikaraishi | B25F 5/001 |
| 2025/0235989 | A1* | 7/2025 | Aoyama | B25F 5/02 |
| 2026/0005579 | A1* | 1/2026 | Bickman | H02K 7/145 |

FOREIGN PATENT DOCUMENTS

| | | | |
|---|---|---|---|
| DE | 102012205274 | A1 | 10/2013 |
| DE | 202016105200 | U1 | 9/2016 |

OTHER PUBLICATIONS

M12 Fuel ⅜" Ratchet, Milwaukee Tools, Praduct 2557-20, URL: https://www.milwaukeetool.com/Praducts/2557, Retrieved Jun. 24, 20225.

M12 Fuel ⅜" Extended Reach Ratchet, Milwaukee Tools, Product 2560-20, URL: https://www.milwaukeetool.com/Products/2560-20, Retrieved Jun. 24, 2025.

* cited by examiner

LIGHTING FEATURES FOR TOOLS

FIELD OF INVENTION

The present invention relates generally to power tools, and more particularly to lighting features for power tools.

BACKGROUND OF THE INVENTION

Power tools, such as power ratchets, and other types of tools, are commonly used in automotive, industrial, and household applications to install and remove threaded fasteners and apply a torque and/or angular displacement to a work piece, such as a threaded fastener, for example. Many power tools are portable and electrically powered, such as with a rechargeable battery, allowing a user to apply torque or force to a workpiece without exerting a substantial amount of energy. Power tools generally include a housing that supports a display and small lights, and houses a motor and electronic components for controlling the motor. However, in the current tools, the lights are small and insufficient to illuminate an area where work is being performed. Thus, users resort to using separate stand-alone light sources to illuminate the work area.

SUMMARY OF THE INVENTION

The present invention relates broadly to a lighting assembly that is incorporated into a tool. The lighting assembly includes a plurality of illumination elements, such as light emitting diodes (LEDs), that can be activated/illuminated individually or together. The illumination elements may be part of one or more lighting elements that cooperatively form the lighting assembly. For example, the lighting assembly may include a first lighting element that is coupled to an elongated housing portion or neck housing of a tool, such as a powered ratchet or powered torque wrench, to provide enhanced illumination, compared to current light features built into cordless tools. In an embodiment, the first lighting element may be disposed in a groove formed in the neck housing. The lighting assembly may also include a second lighting element that is coupled to a handle housing of the tool. In an example, the second lighting element may be in the form of a light ring that faces in a direction towards a working end of the tool to provide illumination. This allows the lighting assembly to provide for enhanced illumination with a small profile compared to prior art tools. Additionally, with the first lighting element coupled to the neck housing, the tool can reach into and illuminate tight spaces better than prior art tools.

In an embodiment, the present invention relates to a lighting assembly for a tool having an actuatable trigger, a motor operably coupled to the actuatable trigger, and an elongated housing portion with a longitudinal length. The lighting assembly includes a first lighting element with a plurality of first illumination elements, and that is adapted to be coupled to and extend along at least a portion of the longitudinal length of the elongated housing portion. The first plurality of illumination elements may be adapted to turn ON when the actuatable trigger is actuated. The lighting assembly may also include a switch that when actuated is adapted to cause the first plurality of illumination elements to turn ON. The switch allows the first plurality of illumination elements to turned ON and OFF without providing power to the motor of the tool.

In another embodiment, the present invention relates to a tool that includes a motor housing portion housing a motor, an elongated housing portion coupled to the motor housing portion and housing a drive shaft that is operably coupled to the motor, an output assembly coupled to the elongated housing portion, and a first lighting element coupled to the elongated housing portion. The tool may also include an actuatable trigger that when actuated causes power to be supplied to the motor and the first lighting element. The tool may also include a switch that when actuated causes power to be supplied to the first lighting element, without causing power to be supplied to the motor.

BRIEF DESCRIPTION OF DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION OF THE INVENTION

Figure 1:
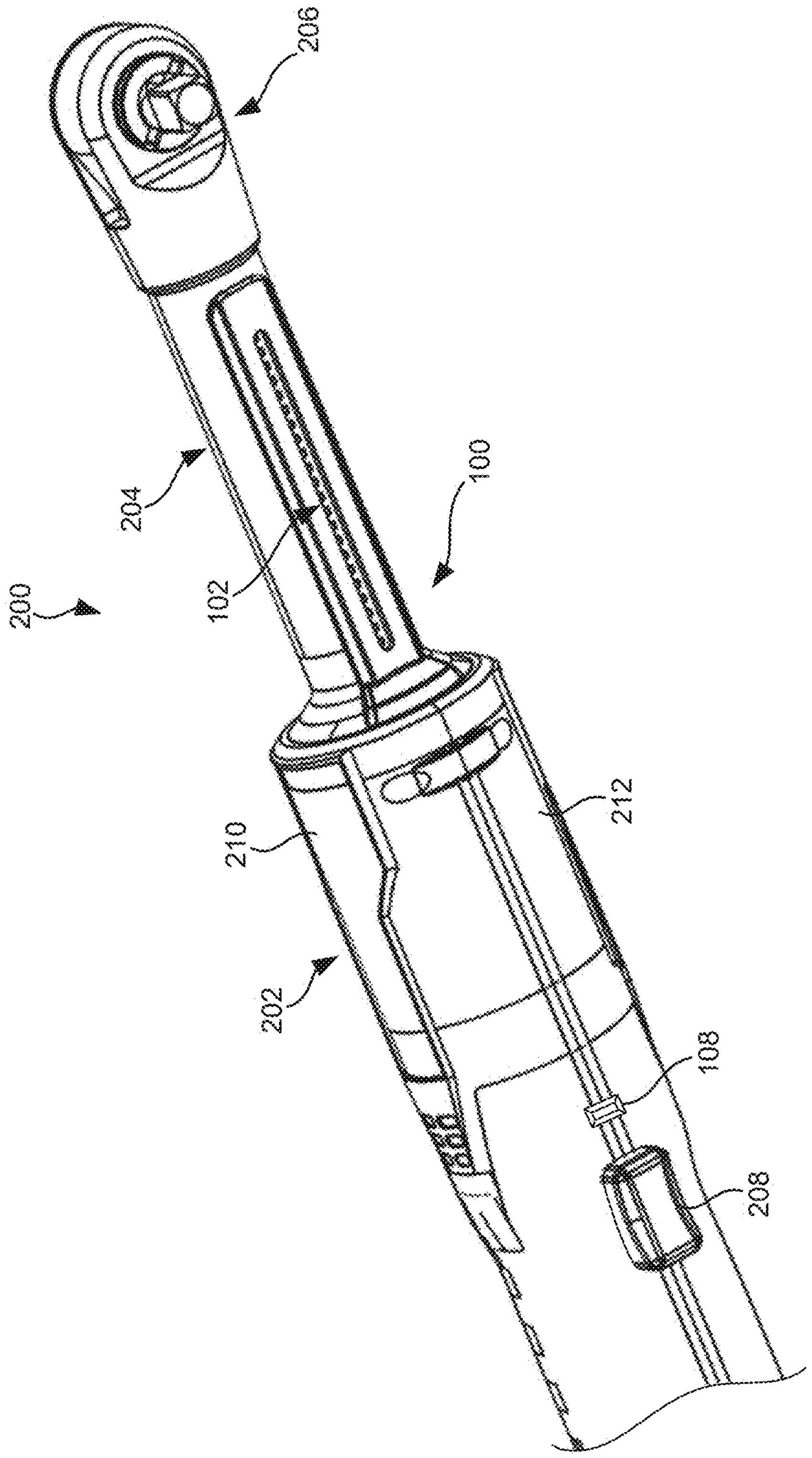
FIG. 1 is a perspective side view of an exemplar lighting assembly incorporated into an tool, according to an embodiment of the present invention.
Figure 2:
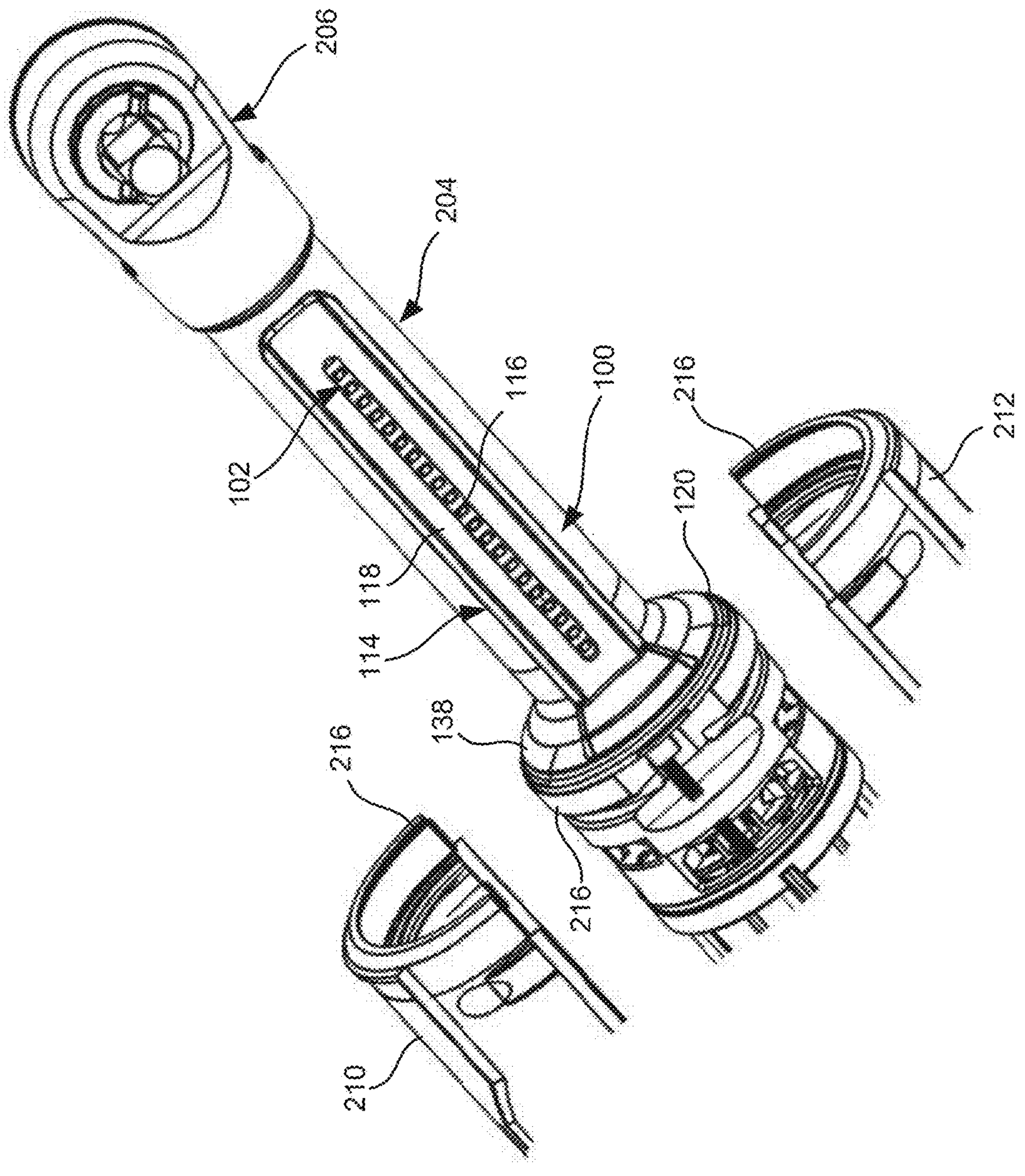
FIG. 2 is a partial exploded perspective view of a working end of the exemplar tool of FIG. 1 with a motor housing separated from a beck housing of the tool.
Figure 3:
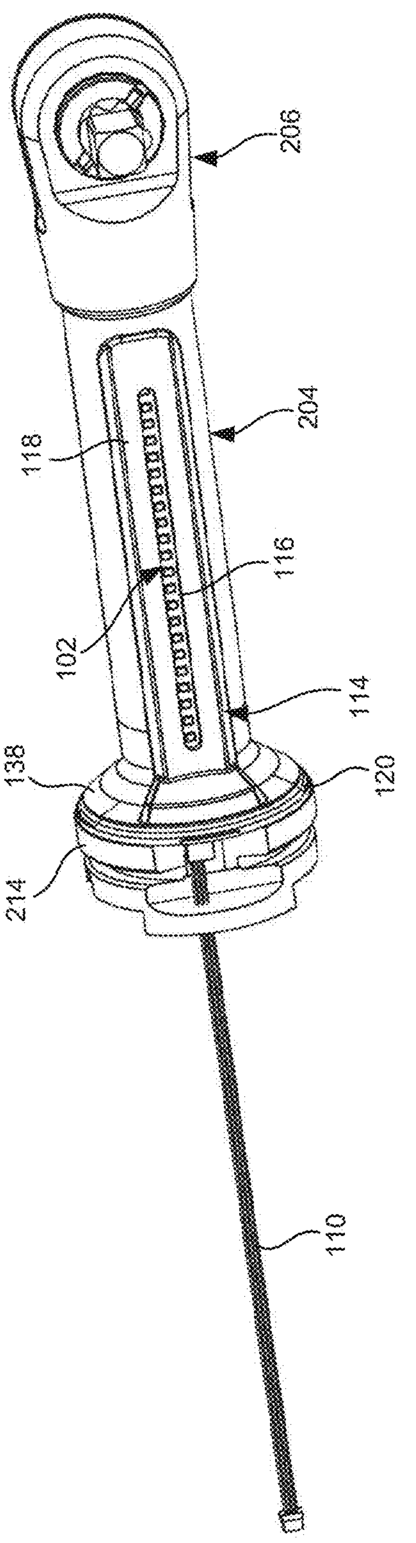
FIG. 3 is a perspective view of a ratchet head and neck housing of the exemplar tool of FIG. 1.

While the present invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a lighting assembly that is incorporated into a tool. The lighting assembly includes a plurality of illumination elements, such as light emitting diodes (LEDs), that can be activated/illuminated individually or together. The illumination elements may be part of one or more lighting elements that cooperatively form the lighting assembly. For example, the lighting assembly may include a first lighting element that is coupled to an elongated housing portion or neck housing of a tool, such as a powered ratchet or powered torque wrench, to provide enhanced illumination, compared to current light features built into cordless tools. In an embodiment, the first lighting element may be disposed in a groove formed in the neck housing. The lighting assembly may also include a second lighting element that is coupled to a handle housing of the tool. In an example, the second lighting element may be in the form of a light ring that faces in a direction towards a working end of the tool to provide illumination. This allows the lighting assembly to provide for enhanced illumination with a small profile compared to prior art tools. Additionally, with the first lighting element coupled to the neck housing, the tool can reach into and illuminate tight spaces better than prior art tools.

Referring to FIG. 1, a lighting assembly 100 incorporated into an exemplar tool 200 (such as a powered ratchet type tool and/or a powered torque wrench type tool) is illustrated. The exemplar tool 200 is described in further detail below, but briefly described here for reference. In general, the exemplar tool 200 includes a tool housing that includes a motor housing portion (also referred to as a handle housing portion) 202 and an elongated housing portion (also referred to as a neck housing portion) 204 that houses a drive shaft and that is operably coupled to the motor housing portion 202. The tool 200 also includes an output assembly 206 that is operably coupled to the elongated housing portion 204 and an actuatable trigger 208. The motor is operably coupled to the actuatable trigger 208 via control electronics, and the control electronics are adapted to be operably coupled to a power source, such as a battery pack, to provide power to the tool 200. Thus, actuation of the trigger 208 (such as depression of the actuatable trigger 208) causes power to be supplied to the motor and the motor to operate and rotate a driveshaft, which operates the output assembly 206 (as known in the art).

The motor housing portion 202 may function as a handle of the tool 200 and include a grip for holding and manipulating the tool 200. The motor housing portion 202 may include first and second housing portions 210, 212 (respectively forming first and second sides of the motor housing portion 202). In an embodiment, the motor housing portion 202 is a clamshell-type housing, where the first and second housing portions 210, 212 are substantially mirror images of each other and coupled together via fasteners to cooperatively form the motor housing portion 202. In another embodiment, the motor housing portion 202 (including the first and second housing portions 210, 212) may be a single integrated or monolithic piece.

Referring to FIGS. 1-6, the lighting assembly 100 includes a first lighting element 102, in the form of a type of light bar, coupled to an extending at least partially along a longitudinal length of the elongated housing portion 204. The first lighting element 102 may extend along at least half of the longitudinal length of the elongated housing portion 204, and preferably along at least three quarters of the longitudinal length of the elongated housing portion 204. The first lighting element 102 includes a first circuit board 104, such as, for example, a printed circuit board (PCB) or flexible printed circuit (FPC) and one or more first illumination elements 106 operably coupled to the first circuit board 104. The first illumination elements 106 can be light emitting diodes (LEDs), chip-on-board (COB) LEDs, surface-mounted device (SMD) LEDs, incandescent, halogen, fluorescent, or high intensity discharge (HID) bulbs, or the like, operationally coupled to the first circuit board 104. Although the first circuit board 104 is shown as having twenty two equidistantly spaced first illumination elements 106, any suitable number of illumination elements can be used and can be spaced in any suitable fashion.

The first circuit board 104 may be operationally and/or electrically coupled to one or more of a switch (such as switch 108 shown in FIG. 1) and/or the actuatable trigger 208, such as via control electronics of the tool 200, to selectively turn the first illumination elements 106 ON and OFF (as described in further detail below). The first circuit board 104 may be operationally and/or electrically coupled to the switch 108 and/or the actuatable trigger 208 via wiring (such as wiring 110 shown in FIG. 3). The first circuit board 104 can be directly coupled to the wiring 110 or coupled to the wiring 110 via a first connector 112. The wiring 110 may be routed within the tool 200 from the first circuit board 104 to any desired location within the motor housing portion 202 and/or elongated housing portion 204 to connect the first circuit board 104 to the switch 108 and/or the actuatable trigger 208.

Figure 7:
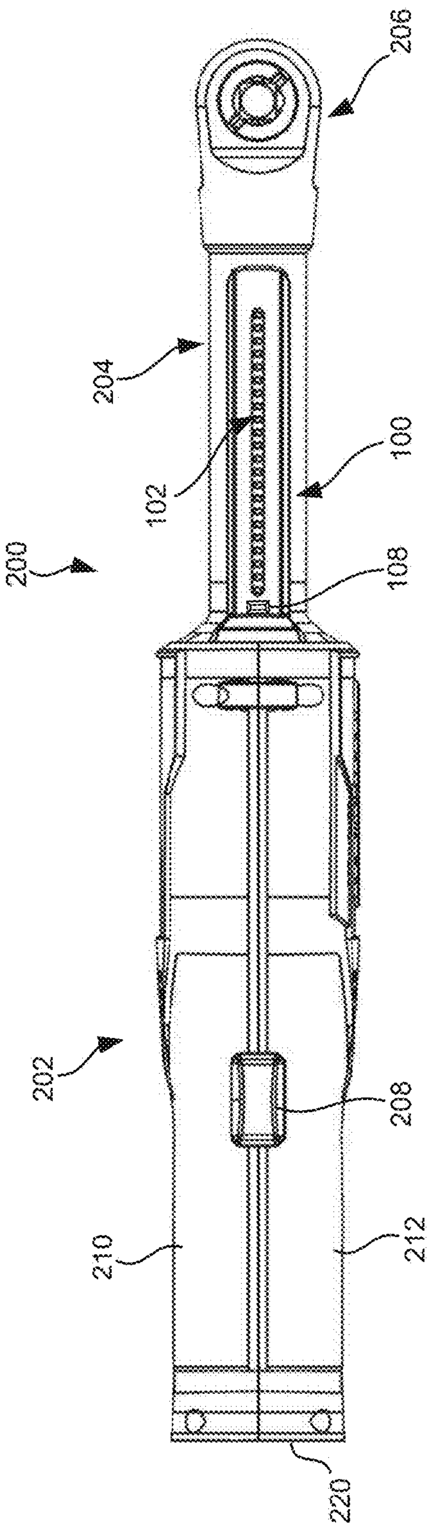
FIG. 7 is a side view of an exemplar lighting assembly with a switch incorporated into a neck housing of an exemplar tool, according to an embodiment of the present invention.
Figure 8:
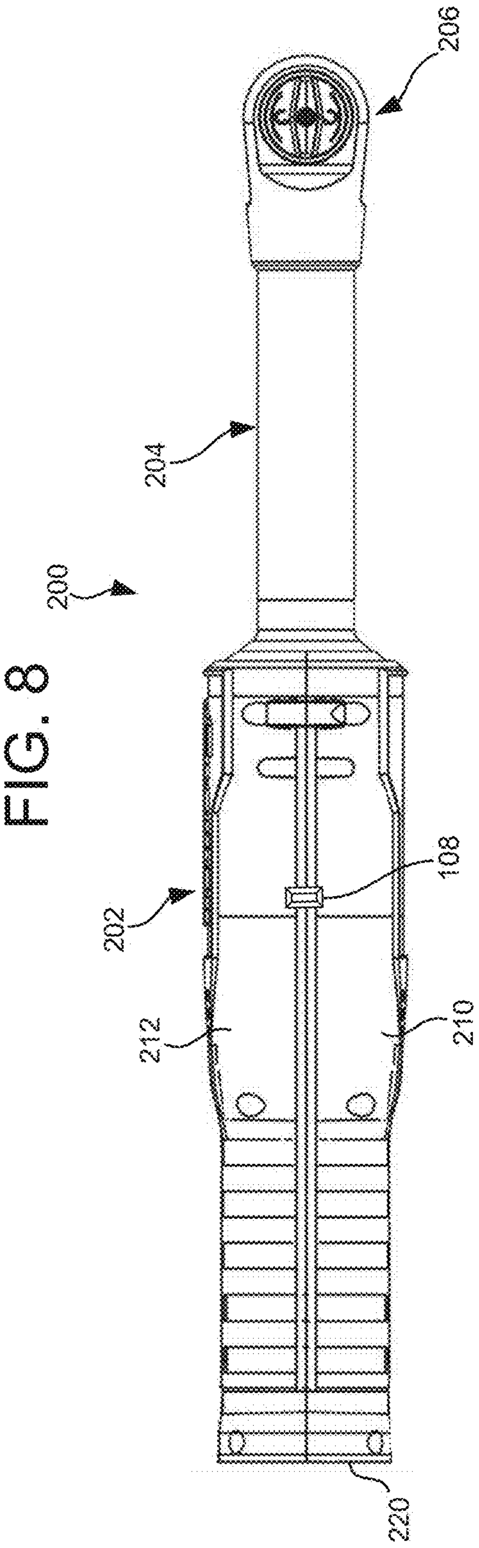
FIG. 8 is a side view of an exemplar lighting assembly with a switch incorporated into a motor housing of an exemplar tool, according to an embodiment of the present invention.

The switch 108 may be a manually operable switch that includes an actuation mechanism that employs a push button type actuator or other type of actuator to activate or operate the switch, such as, for example, a toggle actuator, a touch sensitive actuator, rocker actuator, a slide actuator, magnetic, or other suitable actuator or device. The switch 108 may be disposed anywhere on the tool 200. In an example, as shown in FIG. 1, the switch 108 may be disposed on the motor housing portion 202 proximal to the actuatable trigger 208 (as shown in FIG. 1) to allow a user to easily actuate the switch while operating the tool 200. In other examples, the switch 108 may be disposed on the elongated housing portion 204 proximal to the first circuit board 104 (as shown in FIG. 7), disposed on the motor housing portion 202 on a side opposite the actuatable trigger 208 (as shown in FIG. 8), or any other location on the tool 200.

In an embodiment, the first circuit board 104 is operationally and/or electrically coupled to the both of the switch 108 and the actuatable trigger 208. In this respect, the first illumination elements 106 can be controlled to turn ON or illuminate when the actuatable trigger 208 of the tool 200 is actuated to operate the tool 200; and controlled to turn ON and OFF via the switch 108 without requiring actuation of the actuatable trigger 208.

In an embodiment, the first lighting element 102 is incorporated into the elongated housing portion 204 of the tool 200 to provide a low profile lighting element. For example, a portion of the elongated housing portion 204 may be removed forming a groove 212 having a shape that substantially conforms to a shape of the first circuit board 104. In this respect, the first circuit board 104 may be disposed in the groove 212 and coupled to the elongated housing portion 204 of the tool 200. The first circuit board 104 may be coupled to the elongated housing portion 204 in any suitable manner, such as via an adhesive and/or one or more fasteners.

The depth of the groove 212 may also be deep enough to accommodate the first circuit board 104, and may or may not extend through a sidewall of the elongated housing portion 204. The elongated housing portion 204 houses a rotatable drive shaft of the tool 200 (as described in further detail below), and it is desirable that the first circuit board 104 be separated and/or protected from the rotatable drive shaft. In one example, the groove 212 may not extend through the sidewall of the elongated housing portion 204, thereby separating and protecting the first circuit board 104 from contact with the rotatable drive shaft. In another example, the groove 212 may extend at least partially through the sidewall of the elongated housing portion 204. In this example, the first circuit board 104 may be distanced or spaced from the rotatable drive shaft, such that the first circuit board 104 does not contact the rotatable drive shaft.

The lighting assembly 100 may also include a protective cover 114 that is disposed over the first circuit board 104 and coupled to the elongated housing portion 204 in any suitable manner, such as via an adhesive and/or one or more fasteners. The protective cover 114 may also include a first lens portion 116 that is translucent and adapted to align with the first illumination elements 106 and direct light from the first illumination elements 106. In an embodiment, the first lens portion 116 can be constructed from a light diffusing material to uniformly distribute light emitted from the first illumination elements 106. The first lens portion 116 can be made of a non-colored, clear (i.e. transparent) plastic material, such as, for example, acrylic. However, the invention is not limited as such and the material of the first lens portion 116 need not be clear or fully transparent. Instead, the material can be translucent to some degree. In other examples, the material is a light specific material, i.e., a higher-grade plastic or other material, designed with particular light refracting and propagating characteristics.

In another example, the first lens portion 116 includes patterns of different, predetermined surface features that are configured to transmit, reflect, block, refract, or redirect light in different ways to produce desired light diffusion effects. The surface features could be molded into the surfaces or could be formed into the surfaces by blasting, cutting, mechanical etching, laser etching, engraving, or the like.

Referring to FIGS. 2-6, the protective cover 114 may include an elongated portion 118 and a flange portion 120 disposed at an end of the elongated portion 118. The elongated portion 118 may include a protrusion 122 protruding from an inwardly facing surface of the elongated portion 118. The protrusion 122 is adapted to be disposed in the groove 212 and coupled to the elongated housing portion 204 of the tool 200, such as via an adhesive, and may function to seal and protect the first circuit board 104 from damage and/or contaminants (such as dust and other debris).

The flange portion 120 may be adapted to be coupled to the motor housing portion 202. For example, the flange portion 120 may be disposed on a base portion 214 of the elongated housing portion 204 and engage or be received by a circumferential rim 216 of the motor housing portion 202, such that the flange portion 120 is "sandwiched" between the circumferential rim 216 and the base portion 214. Thus, the protective cover 114 is coupled to the tool 200 via the interaction of the protrusion 122 with the groove 212, and the flange portion 120 being "sandwiched" between the circumferential rim 216 and the base portion 214.

The lighting assembly 100 may also include a second lighting element 124, in the form of a type of light ring, that is disposed circumferentially around the elongated housing portion 204 substantially at an area of intersection between the elongated housing portion 204 and the motor housing portion 202. The second lighting element 124 includes a second circuit board 126, such as, for example, a printed circuit board (PCB) or flexible printed circuit (FPC) and one or more second illumination elements 128 operably coupled to the second circuit board 126. The second illumination elements 128 can be light emitting diodes (LEDs), chip-on-board (COB) LEDs, surface-mounted device (SMD) LEDs, incandescent, halogen, fluorescent, or high intensity discharge (HID) bulbs, or the like, operationally coupled to the first circuit board 104. Although the second circuit board 126 is shown as having six equidistantly spaced second illumination elements 128, any suitable number of illumination elements can be used and can be spaced in any suitable fashion.

The second circuit board 126 may be operationally and/or electrically coupled, independent of the first circuit board 106 or cooperatively with the first circuit board 106, to one or more of the switch 108 and/or the actuatable trigger 208, such as via control electronics of the tool 200, to selectively turn the second illumination elements 128 ON and OFF. The second circuit board 126 may be operationally and/or electrically coupled, independent of the first circuit board 106 or cooperatively with the first circuit board 106, to the switch 108 and/or the actuatable trigger 208 via wiring (such as wiring 110 shown in FIG. 3). The second circuit board 126 can be directly coupled to the wiring 110 or coupled to the wiring 110 via a second connector 130.

When the lighting assembly 100 includes the second lighting element 124, the flange portion 120 of the protective cover 114 is disposed over the second circuit board 126. The second circuit board 126 may also be recessed in the flange portion 120 of the protective cover 114. For example, the flange portion 120 may include a recess 132 and the second circuit board 126 may be disposed in the recess 132. In this respect, the second circuit board 126 may be "sandwiched" between the flange portion 120 of the protective cover 114 and the base portion 214 of the tool 200. The second circuit board 126 may also have a substantially circular shape and include one or more protrusions 134 that are adapted to engage or be received in corresponding cutouts 136 in the flange portion 120 to restrict rotational movement of the second circuit board 126.

The protective cover 114 may also include a second lens portion 138 that is translucent and adapted to align with the second illumination elements 128 and direct light from the second illumination elements 128. Similar to the first lens portion 116, the second lens portion 138 can be constructed from a light diffusing material to uniformly distribute light emitted from the second illumination elements 128. The second lens portion 138 can be made of a non-colored, clear (i.e. transparent) plastic material, such as, for example, acrylic. However, the invention is not limited as such and the material of the second lens portion 138 need not be clear or fully transparent. Instead, the material can be translucent to some degree. In other examples, the material is a light specific material, i.e., a higher-grade plastic or other material, designed with particular light refracting and propagating characteristics. In another example, the second lens portion 138 includes patterns of different, predetermined surface features that are configured to transmit, reflect, block, refract, or redirect light in different ways to produce desired light diffusion effects. The surface features could be molded into the surfaces or could be formed into the surfaces by blasting, cutting, mechanical etching, laser etching, engraving, or the like.

To assemble the lighting assembly 100 to the tool 200, the first lighting assembly 102 may be disposed in the groove 212 and coupled to the elongated housing portion 204 of the tool 200. Alternatively, the first lighting assembly 102 may be coupled to the inwardly facing surface of the elongated portion 118, with the first lens portion 116 aligned with the first illumination elements 106, prior to the protective cover 114 being assembled onto the elongated housing portion 204. The second lighting assembly 124 may also be slid onto the elongated housing portion 204 and disposed adjacent to the base portion 214 of the elongated housing portion 204.

As illustrated, the second circuit board 126 of the second lighting assembly 124 may be ring shaped and include a central aperture that allows the second lighting assembly 124 to be disposed circumferentially around the elongated housing portion 204. The second lighting assembly 124 may be disposed on the elongated housing portion 204 prior to or after the output assembly 206 is coupled to the elongated housing portion 204. The base portion 214 of the elongated housing portion 204 may also include a cutout 218 adapted to accommodate the second connector 130 and/or the wiring 110.

The wiring, such as wiring 110, may be operationally and/or electrically coupled to the first and second lighting assemblies 102, 124. The protective cover 114 is also slid onto the elongated housing portion 204 and disposed adjacent to the base portion 214 of the elongated housing portion 204, with the elongated portion 118 aligned with the first lighting assembly 102, the first lens portion 116 aligned with the first illumination elements 106, and the protrusion 122 disposed in the groove 212 and coupled to the elongated housing portion 204 of the tool 200. The flange portion 120 of the protective cover 114 may also be ring shaped and include a central aperture that allows the flange portion 120 of the protective cover 114 to be disposed circumferentially around the elongated housing portion 204, with the second circuit board 126 recessed in the flange portion 120 and "sandwiched" between the flange portion 120 of the protective cover 114 and the base portion 214 of the tool 200, and the one or more protrusions 134 received in the corresponding cutouts 136 in the flange portion 120. When the protective cover 114 is disposed on the elongated housing portion 204, the second lens portion 138 is also aligned with the second illumination elements 128. The protective cover 114 may also include a cutout 140 adapted to accommodate the first connector 112 and/or the wiring 110.

The wiring, such as wiring 110, may also be operationally and/or electrically coupled to the switch 108 and/or the actuatable trigger 208. The circumferential rim 216 of the motor housing portion 202 is also engaged with the flange portion 120 of the protective cover 114, such that the flange portion 120 is "sandwiched" between the circumferential rim 216 and the base portion 214 of the tool 200.

As mentioned above, the lighting assembly 100, including one or both of the first and second lighting elements 102, 124 may be incorporated into the tool 200 (such as a powered ratchet type tool and/or a powered torque wrench type tool). In this respect, referring to FIGS. 1 and 9, the motor housing portion 202 of the tool 200 may extend from the elongated housing portion 204 and/or lighting assembly 100 to a power source receiving end 220 that is adapted to receive and couple to a power source, such as a removable battery pack, for providing power to the tool 200 and lighting assembly 100.

The motor housing portion 202 houses internal components, such as a motor 222, control electronics 224, and the actuatable trigger 208 adapted to operate the motor 222 and thereby the output assembly 206. The motor 222 is disposed in and supported in the motor housing portion 202 and operably coupled to the trigger 208 via the control electronics 224. The control electronics 224 may include motor control electronics 226 operably coupled to and adapted to control the motor 222, and power control electronics 228 operably coupled to the motor control electronics 226, power receiving terminals 230, actuatable trigger 208, and the lighting assembly 100 (including the switch 108). The power receiving terminals 230 are adapted to be operably coupled to a power source, such as a battery pack, to provide power to the tool 200 and lighting assembly 100. In an embodiment, the actuatable trigger 208 is operably coupled to the power control electronics 228 and motor control electronics 226. Actuation of the actuatable trigger 208 (such as depression of the actuatable trigger 208) causes power to be supplied to the lighting assembly 100 to illuminate the first illumination elements 106 and/or the second illumination elements 128, and also causes power to be supplied to the motor 222 and the motor 222 to operate and rotate a motor shaft (as known in the art) in either one of first and second (e.g., forward and reverse or clockwise and counter-clockwise) rotational directions, in a well-known manner.

The switch 108 may be operably coupled to the power control electronics 228 or a separate PCB driver board that can be disposed in the motor housing portion 202 and coupled to the power receiving terminals 230. Similarly, the switch 108 may also be operably coupled to the first circuit board 104 and/or the second circuit board 126 to control power to be supplied to the respective first and second illumination elements 106, 128.

It should be appreciated that the lighting assembly 100 can include one or both of the first and second lighting elements 102, 124. When the lighting assembly 100 includes one of the lighting elements, such as the first lighting element 102, the first illumination elements 106 can be controlled by the switch 108 and actuation of the actuatable trigger 208. For example, when the actuatable trigger 208 is actuated by a user, power may be supplied to cause the first illumination elements 106 to turn ON; and when the actuatable trigger 208 is released, the first illumination elements 106 may be controlled to turn OFF. The first illumination elements 106 may also remain ON for a predetermined amount of time after the actuatable trigger 208 is released, prior to turning OFF. Similarly, the power supplied to the first illumination elements 106 can be controlled to turn ON the first illumination elements 106 via activation of the switch 108 a first time; and controlled to turn OFF the first illumination elements 106 via activation of the switch 108 a second time. The first illumination elements 106 can also be controlled to be dimmable via holding down the switch 108.

When the lighting assembly 100 includes both of the first and second lighting elements 102, 124, power supplied to the first and second lighting elements 102, 124 can be controlled by the switch 108 and actuation of the actuatable trigger 208. For example, when the actuatable trigger 208 is actuated by a user, one or both of the first illumination elements 106 and second illumination elements 128 can be controlled to turn ON; and when the actuatable trigger 208 is released, the one or both of the first illumination elements 106 and second illumination elements 128 can be controlled to turn OFF. The one or both of the first illumination elements 106 and second illumination elements 128 may also remain ON for a predetermined amount of time after the actuatable trigger 208 is released, prior to turning OFF.

Similarly, power supplied to the first and second illumination elements 106, 128 can be controlled to turn ON the first and second illumination elements 106, 128 via activation of the switch 108. The switch 108 allows the first and second illumination elements 106, 128 to be controlled independent of the actuatable trigger 208, and allows the lighting assembly 100 to be used in more of a flashlight type of application to illuminate an area.

In an example, activation of the switch 108 a first time may cause each of the first and second illumination elements 106, 128 to turn ON; and activation of the switch 108 a second time may cause each of the first and second illumination elements 106, 128 to turn OFF. The first and second illumination elements 106, 128 can also be controlled to be dimmable via holding down the switch 108.

In another example, activation of the switch 108 a first time may cause each of the first and second illumination elements 106, 128 to turn ON; activation of the switch 108 a second time may cause only the second illumination elements 128 to turn OFF; and activation of the switch 108 a third time may then cause the first illumination elements 106 to turn OFF. In this example, the first and second illumination elements 106, 128 can also be controlled to be dimmable via holding down the switch 108.

In another example, activation of the switch 108 a first time may cause one of the first illumination elements 106 or the second illumination elements 128 to turn ON; activation of the switch 108 a second time may cause the other of the first illumination elements 106 or the second illumination elements 128 to also turn ON; and activation of the switch 108 a third time may cause the first and second illumination elements 106, 128 to turn OFF. In this example, the first and second illumination elements 106, 128 can also be controlled to be dimmable via holding down the switch 108.

In yet another example, activation of the switch 108 a first time may cause one of the first illumination elements 106 or the second illumination elements 128 to turn ON; activation of the switch 108 a second time may cause the ON first illumination elements 106 or second illumination elements 128 to turn OFF and the other of the first illumination elements 106 or the second illumination elements 128 to turn ON; activation of the switch 108 a third time may cause each of the first and second illumination elements 106, 128 to turn ON; and activation of the switch 108 a fourth time may cause the first and second illumination elements 106, 128 to turn OFF. In this example, the first and second illumination elements 106, 128 can also be controlled to be dimmable via holding down the switch 108.

While various examples of how the switch 108 can operate are provided above, it should be appreciated that the switch 108 can be configured in any number of ways to control ON and OFF of the first and second illumination elements 106, 128. One or more of the first and second illumination elements 106, 128 may be multicolor illumination elements. When one or more of the first and second illumination elements 106, 128 are multicolor illumination elements, the switch 108 may be configured to also be used to change the color or cycle through various colors of the illumination elements.

Figure 9:
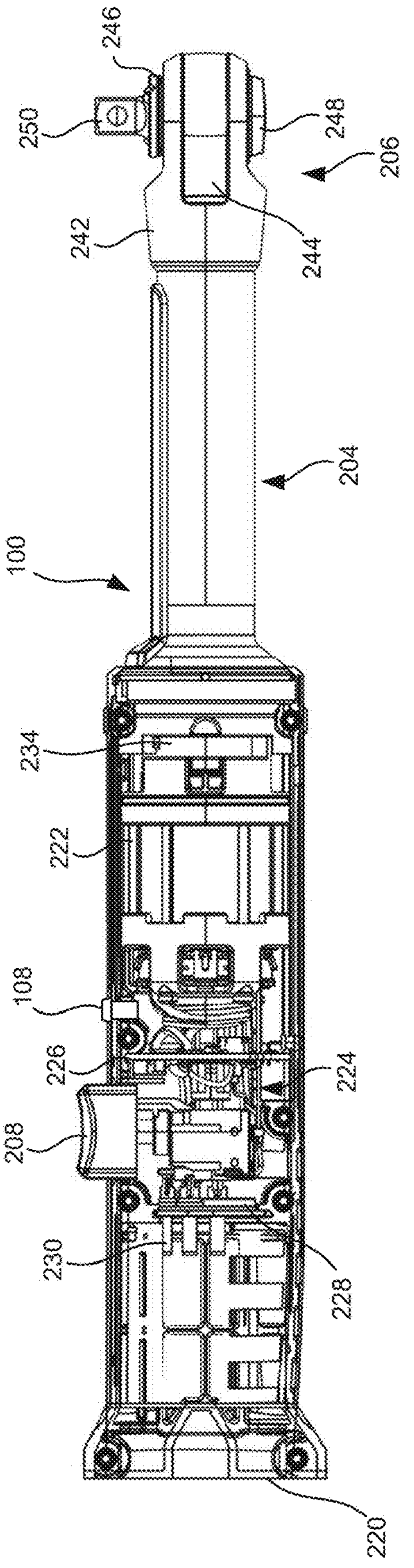
FIG. 9 is a side view of an exemplar tool with a motor housing removed, illustrating exemplar internal components of the tool.

Referring to FIG. 9, the motor 222 may be a brushless DC (BLDC) or a brushed-type motor, or any other suitable motor (e.g., pneumatically or hydraulically operated or AC operated motor). The motor 222 may include the motor shaft (as known in the art) that is operably coupled to the output assembly 206. Thus, actuation of the actuatable trigger 208 by a user (such as depression of the actuatable trigger 208) causes the motor 222 to operate and operate the output assembly 206.

As mentioned above, the control electronics 224 may include the motor control electronics 226 operably coupled to and adapted to control the motor 222. For example, the motor control electronics 226 may include a motor printed circuit board (PCB) that is operably coupled to the actuatable trigger 208 and motor 222. The motor PCB may include one or more switching elements disposed thereon. The switching elements may be field effect transistors (FETs), such as, for example, metal-oxide semiconductor field-effect transistors (MOSFETs). In an embodiment, the switching elements may include three high-side switching elements, H1, H2, and H3, and three low-side switching elements, L1, L2, and L3, each being operable in either one of a first or conducting state and a second or non-conducting state. The switching elements are controlled to selectively apply power from a power source (e.g., a battery pack) to the motor 222 to achieve desired commutation. By selectively activating particular high-side and low-side switching elements, the motor 222 is operated by having the motor PCB send a current signal through coils located on a stationary part of the motor 222 called a stator. The coils cause a magnetic force to be applied to a rotating part of the motor 222, called a rotor, when current runs through the coils. The rotor contains permanent magnets that interact with magnetic forces created by the windings of the stator. By selectively activating successive combinations of high and low-side switching elements in a particular order, thereby sending a particular order of current signals through the windings of the stator, the stator creates a rotating magnetic field which interacts with the rotor causing it to rotate, which causes rotation of the motor shaft, in a well-known manner.

As mentioned above, the control electronics 224 may also include the power control electronics 228. The power control electronics 228 may include a power printed circuit board (PCB) that is operably coupled to the motor control electronics 226, power receiving terminals 230, actuatable trigger 208, and lighting assembly 100 (such as via the switch 108). In an embodiment, the actuatable trigger 208 is a linearly depressible trigger that is depressible inwardly, relative to the tool 200, to operate the lighting assembly 100 and cause the tool 200 to operate, and a release of the actuatable trigger 208 causes the actuatable trigger 208 to bias outwardly, relative to the tool 200, to cease operation of the tool 200. The actuatable trigger 208 and control electronics 224 may also operate via a variable speed type mechanism. In this regard, actuation or depression of the actuatable trigger 208 can cause the motor 222 to rotate the motor shaft at a faster speed the further the actuatable trigger 208 is depressed. In another embodiment, the actuatable trigger 208 may be a rocker type of trigger switch, where depression of a top portion (portion proximal to the elongated housing portion 204/lighting assembly 100) of the actuatable trigger 208 causes the tool 200 to operate in a first rotational direction (such as a clockwise rotational direction), and depression of a bottom portion (portion distal to the elongated housing portion 204/lighting assembly 100) of the actuatable trigger 208 causes the tool 200 to operate in a second rotational direction (such as a counter-clockwise rotational direction).

Figure 4:
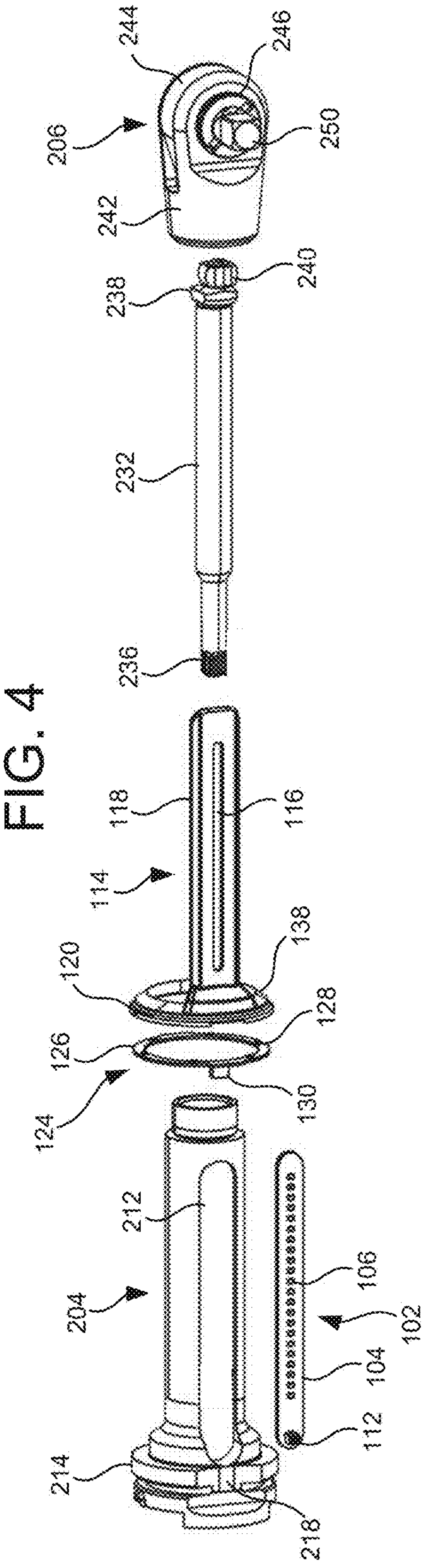
FIG. 4 is a first exploded perspective view of the lighting assembly and neck housing of the exemplar tool of FIG. 1.
Figure 5:
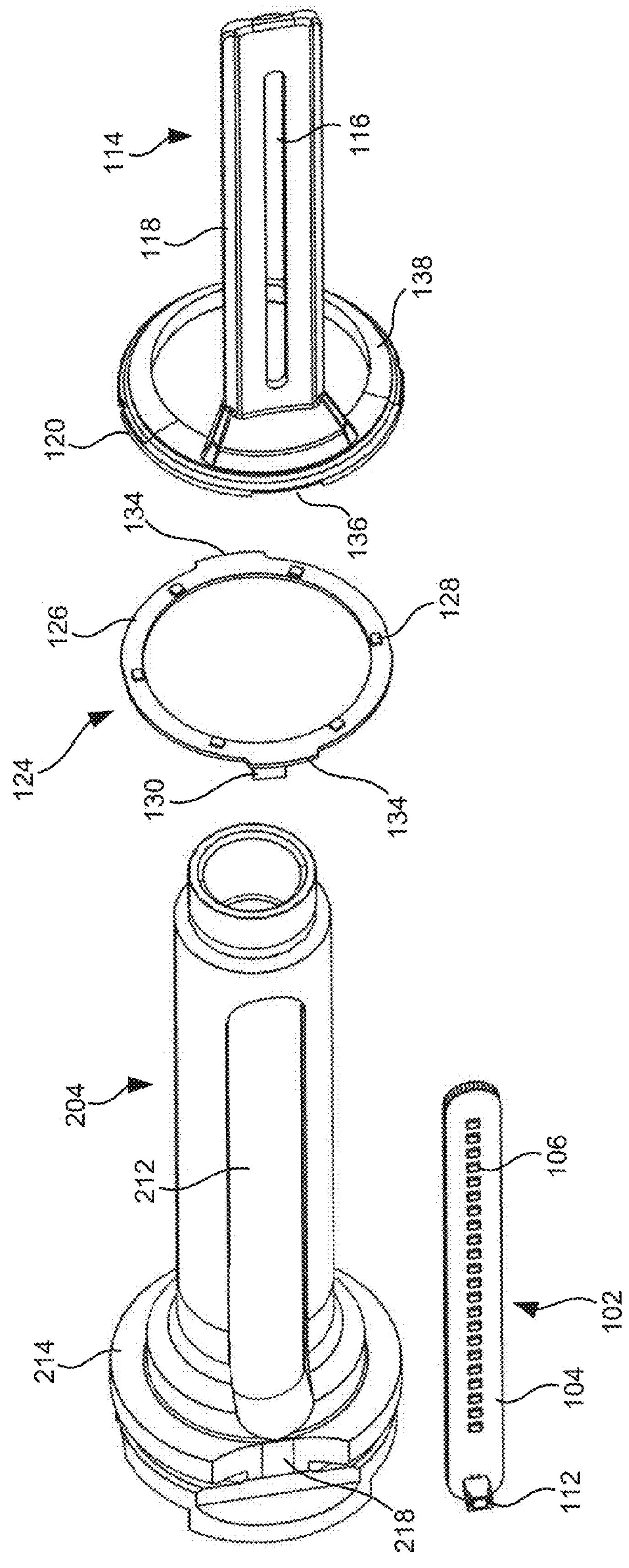
FIG. 5 is a second exploded perspective view of the lighting assembly and neck housing of the exemplar tool of FIG. 1.
Figure 6:
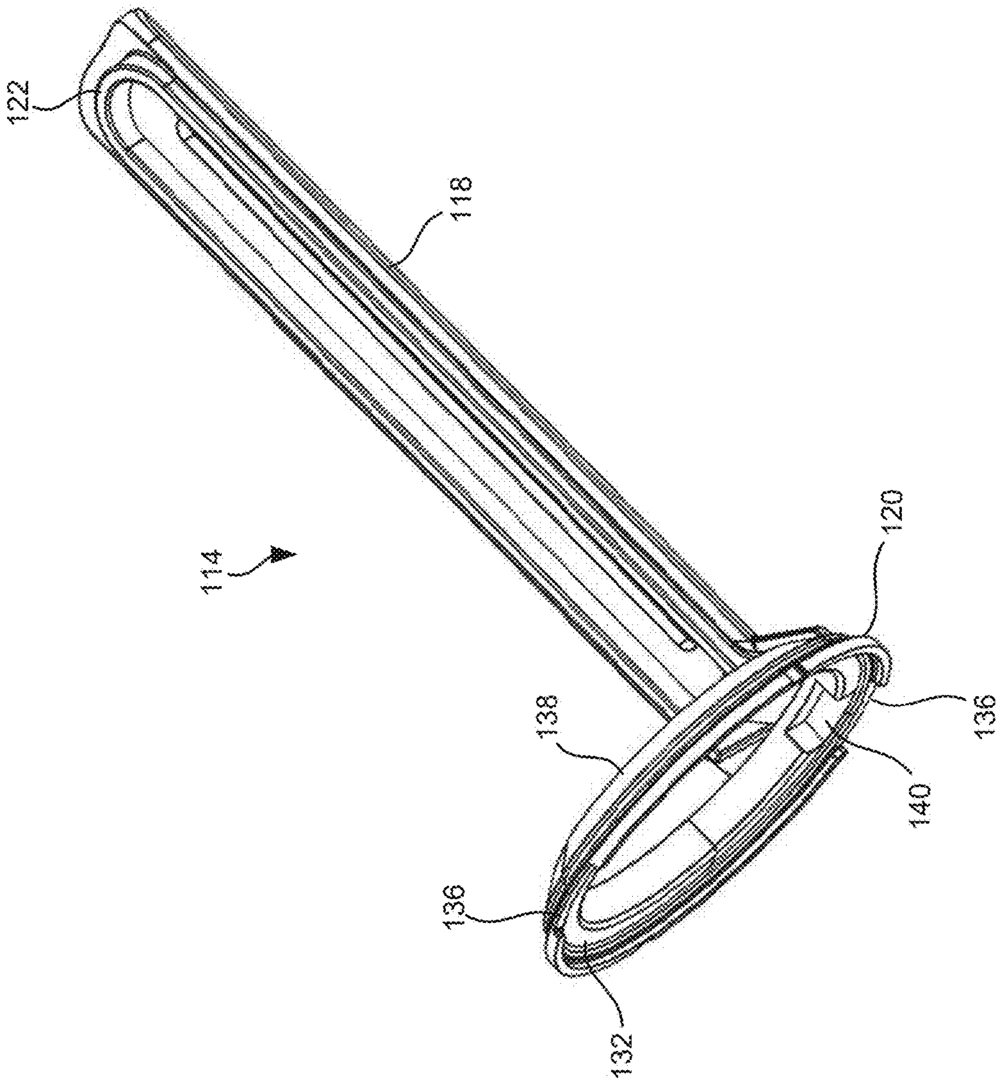
FIG. 6 is a perspective view of a protective cover of the lighting assembly of the exemplar tool of FIG. 1.

Referring to FIGS. 4 and 9, the elongated housing portion/neck housing portion 204 is hollow and houses a drive shaft 232 that is operably coupled to the motor 222. In an embodiment, the drive shaft 232 may be operably coupled to the motor 222 via a gear mechanism 234 (shown in FIG. 9). The gear mechanism 234 may include a ring gear with internal gear teeth that meshingly engage gear teeth of one or more pinion gears that are operably coupled to a carrier. In this embodiment, a motor gear on the motor shaft of the motor 222 meshingly engages the gear teeth of the pinion gears, and a first end 236 of the drive shaft 232 includes gear teeth that meshingly engage with gear teeth of the carrier. Thus, rotation of the motor shaft of the motor 222 causes rotation of the drive shaft 232 within the elongated housing portion 204. The drive shaft 232 may also be rotationally supported in the elongated housing portion 204 via one or more bearings disposed around an external surface of the drive shaft 232. A second end 238 of the drive shaft 232, opposite to the first end 236 and distal to the motor 222, may include an eccentric type crank 240. For example, the eccentric type crank 240 may include an offset pin with a bushing for operating the output assembly 206.

The output assembly 206 includes a head housing portion 242, a yoke 244 disposed in the head housing portion 242, and an output mechanism 246 disposed in the yoke 244 and head housing portion 242. The output mechanism 246 may include a selector switch 248, a pawl carrier and one or more pawls, and an output drive lug 250. The drive lug 250 is adapted to apply torque to a work piece, such as a fastener, via an adapter, bit, or socket coupled to the drive lug 250, such as a bi-directional ratcheting square or hexagonal drive. As illustrated, the drive lug 250 is a "male" connector designed to fit into or matingly engage a female counterpart. However, the drive lug 250 may alternately include a "female" connector designed to matingly engage a male counterpart. The drive lug 250 may also be structured to directly engage a work piece without requiring coupling to an adapter, bit, or socket. The rotational direction of the drive lug 250 can also be selected by rotation of the selector switch 248 to be either a first or second rotational direction (such as, clockwise or counterclockwise).

When assembled, the eccentric type crank 240 of the drive shaft 232 is disposed in a recess of the yoke 244. Thus, when the actuatable trigger 208 is actuated (such as via depression of the actuatable trigger 208) power is supplied to the motor 222 and causes the motor 222 to operate and rotate the motor shaft, which causes rotation of the drive shaft 232, via the gear mechanism 234. Rotation of the drive shaft 232 causes oscillating motion of the yoke 244, via the eccentric type crank 240, which causes rotation of the output mechanism 246 and drive lug 250 in one of the selected first and second rotational directions (based on a position of the selector switch 248).

While the tool 200 is described above as having an output drive lug 250, the tool 200 may have different types of output mechanisms. For example, the tool 200 may include a drill chuck, a hammer type output with a drill chuck or a drive lug, an impact type mechanism with a drill chuck or a drive lug, etc. The drive lug or drill chuck or can be coupled to other devices, such as a socket or other adapter, to apply torque to a work piece, such as, for example, a screw or bolt, in a well-known manner.

While the tool 200 and lighting assembly 100 are described as powered by a battery, the tool 200 and lighting assembly 100 may be power by other electrical power sources, such as an external wall outlet, etc.

As discussed herein, the lighting assembly 100 is described as being incorporated into a tool 200 that is a powered ratchet and/or powered torque wrench. However, the lighting assembly 100 may be incorporated into other types of tools, such as any electrically powered or hand-held tool, including, without limitation, a hammer drill, impact drill, impact wrench, impact ratchet wrench, or other powered tool, that is powered by electricity via a power source (such as a wall outlet and/or generator outlet) or a battery.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool comprising:

a motor housing portion housing a motor;

an elongated housing portion coupled to the motor housing portion and housing a drive shaft that is operably coupled to the motor;

an output assembly coupled to the elongated housing portion; and a first lighting element coupled to and arranged longitudinally along at least a portion of the elongated housing portion.

2. The tool of claim 1, wherein the elongated housing portion includes a groove, and the first lighting element is disposed in the groove.

3. The tool of claim 1, further comprising a protective cover with a lens portion disposed over the first lighting element and coupled to the elongated housing portion.

4. The tool of claim 1, further comprising an actuatable trigger that when actuated causes power to be supplied to the motor and the first lighting element.

5. The tool of claim 1, further comprising a switch that when actuated causes power to be supplied to the first lighting element.

6. A tool comprising:

a motor housing portion housing a motor;

an elongated housing portion coupled to the motor housing portion and housing a drive shaft that is operably coupled to the motor;

an output assembly coupled to the elongated housing portion;

a first lighting element coupled to the elongated housing portion; and a second lighting element disposed circumferentially around the elongated housing portion substantially at an area of intersection between the elongated housing portion and the motor housing portion.

7. The tool of claim 6, further comprising an actuatable trigger that when actuated causes power to be supplied to each of the motor, the first lighting element, and the second lighting element.

8. The tool of claim 6, further comprising a switch that when actuated causes power to be supplied to at least one of the first and second lighting elements.

9. The tool of claim 6, further comprising a protective cover with a first lens portion disposed over the first lighting element and a second lens portion disposed over the second lighting element.

10. The tool of claim 6, wherein each of the first and second lighting elements includes a plurality of illumination elements.

11. A lighting assembly for a tool having an actuatable trigger, a motor operably coupled to the actuatable trigger, and an elongated housing portion with a longitudinal length, the lighting assembly comprising:

a first lighting element including a plurality of first illumination elements that are longitudinally arranged, and the first lighting element is adapted to be coupled to and extend longitudinally along at least a portion of the longitudinal length of the elongated housing portion.

12. The lighting assembly of claim 11, wherein the first lighting element includes a first circuit board and the plurality of first illumination elements are disposed on the first circuit board.

13. The lighting assembly of claim 11, wherein the first plurality of illumination elements are adapted to turn ON when the actuatable trigger is actuated.

14. The lighting assembly of claim 11, further comprising a switch that when actuated is adapted to cause the first plurality of illumination elements to turn ON.

15. The lighting assembly of claim 11, further comprising a second lighting element including a plurality of second illumination elements, and adapted to be disposed circumferentially around the elongated housing portion.

16. The lighting assembly of claim 15, wherein the second lighting element includes a second circuit board and the plurality of second illumination elements are disposed on the second circuit board.

17. The lighting assembly of claim 15, wherein the first and second plurality of illumination elements are light emitting diodes.

18. The lighting assembly of claim 15, wherein the first and second plurality of illumination elements are adapted to turn ON when the actuatable trigger is actuated.

19. The lighting assembly of claim 15, further comprising a switch that when actuated is adapted to cause at least one of the first plurality of illumination elements and the second plurality of illumination elements to turn ON.

20. The lighting assembly of claim 15, further comprising a protective cover with a first lens portion disposed over the first plurality of illumination elements and a second lens portion disposed over the second plurality of illumination elements.

* * * * *